United States Patent
Hata

(10) Patent No.: US 9,449,502 B2
(45) Date of Patent: Sep. 20, 2016

(54) TELEMETER SYSTEM, VENDING MACHINE, AND METHOD FOR TERMINAL DEVICE

(71) Applicant: KYOCERA CORPORATION, Kyoto-shi, Kyoto (JP)

(72) Inventor: Mitsutaka Hata, Kanagawa (JP)

(73) Assignee: KYOCERA Corporation, Kyoto (JP)

(*) Notice: Subject to any disclaimer, the term of this patent is extended or adjusted under 35 U.S.C. 154(b) by 539 days.

(21) Appl. No.: 13/648,675

(22) Filed: Oct. 10, 2012

(65) Prior Publication Data
US 2013/0082847 A1    Apr. 4, 2013

Related U.S. Application Data

(63) Continuation of application No. 12/159,085, filed as application No. PCT/JP2006/323087 on Nov. 20, 2006, now Pat. No. 8,330,618.

(30) Foreign Application Priority Data

Dec. 26, 2005 (JP) ................... 2005-372170

(51) Int. Cl.
G08C 19/22 (2006.01)
G08C 19/00 (2006.01)
G01D 21/00 (2006.01)

(52) U.S. Cl.
CPC ............... *G08C 19/00* (2013.01); *G01D 21/00* (2013.01)

(58) Field of Classification Search
CPC .............................. G08C 19/00; G01D 21/00
USPC ......... 341/870.07, 635, 870.01, 870.11, 665, 341/541, 3.1, 5.4
See application file for complete search history.

(56) References Cited

U.S. PATENT DOCUMENTS 4,412,292 A    10/1983  Sedam et al. ................. 700/241
5,091,713 A     2/1992  Horne et al. .................. 340/541
(Continued)

FOREIGN PATENT DOCUMENTS

JP    406188880 A  *  7/1994
JP    08-235480        9/1996
(Continued)

OTHER PUBLICATIONS

International Preliminary Report on Patentability for corresponding PCT application PCT/JP2006/323087.
(Continued)

*Primary Examiner* — Jean B Jeanglaude
(74) *Attorney, Agent, or Firm* — Studebaker & Brackett PC

(57) ABSTRACT

A telemeter system in which information that has an effect on a state of communication between a terminal device and a central device can be readily and accurately reported from the terminal device to the central device. When a central device transmits a request signal for prescribed measurement result information to a terminal device, a terminal control component of the terminal device extracts the measurement result information from a measurement component, and transmits the measurement result information to the central device. When a communication component of the central device receives the measurement result information, a center control component stores the received measurement result information in a storage component. The state of communication between the terminal device and the central device is reported to an administrator as necessary.

10 Claims, 5 Drawing Sheets

(56) References Cited

U.S. PATENT DOCUMENTS

| | | |
|---|---|---|
| 5,388,101 A | 2/1995 | Dinkins |
| 5,592,491 A | 1/1997 | Dinkins |
| 5,748,103 A | 5/1998 | Flach et al. ............. 340/870.07 |
| 6,111,872 A | 8/2000 | Suematsu et al. ............ 370/350 |
| 6,970,952 B2 * | 11/2005 | Motoyama ..................... 710/15 |
| 2001/0048374 A1 | 12/2001 | Blad ........................ 340/870.11 |
| 2003/0030539 A1 | 2/2003 | McGarry et al. ............... 340/5.9 |
| 2004/0207540 A1 | 10/2004 | Tanaka |
| 2006/0219777 A1 | 10/2006 | Arora et al. .................. 235/381 |
| 2008/0150724 A1 | 6/2008 | Richards ................... 340/572.4 |

FOREIGN PATENT DOCUMENTS

| | | |
|---|---|---|
| JP | 08-280076 | 10/1996 |
| JP | 10-222736 | 8/1998 |
| JP | 2000-242329 | 9/2000 |
| JP | 2000-287279 | 10/2000 |
| JP | 2001-157280 | 6/2001 |
| JP | 2003-044906 | 2/2003 |
| JP | 2003-346228 | 12/2003 |
| JP | 2004-295743 | 10/2004 |
| WO | WO 95/05609 | 2/1995 |

OTHER PUBLICATIONS

Japanese language office action dated Jul. 26, 2011 and its partial English language translation for corresponding Japanese application 2005-372170.

* cited by examiner the present invention relates to a telemeter system, tele-
TELEMETER SYSTEM, VENDING MACHINE, AND METHOD FOR TERMINAL DEVICE This application is a continuation of U.S. Ser. No. 12/159,085, which is a national stage of international application no. PCT/JP2006/323087, filed on Nov. 20, 2006, and claims the benefit of priority under 35 USC 119 of Japanese application no. 2005-372170, filed on Dec. 26, 2005, which are incorporated herein by reference.

TECHNICAL FIELD

The present invention relates to a telemeter system, telemeter system control method, and information recording medium for monitoring and controlling a variety of facilities located in remote areas.

BACKGROUND ART

Telemeter systems have conventionally been used for monitoring and controlling various facilities located in remote areas. In a telemeter system, terminal devices (child stations) are installed in a variety of facilities located in remote areas, and a variety of information to be monitored is transmitted from the terminal devices to a central device (parent station) for centrally performing monitoring in a concentrated manner.

For example, in Japanese Laid-open Patent Application No. 2000-242329, a configuration is disclosed wherein a telemeter system in which a dedicated line is used, and in which facilities that are to be monitored and controlled are monitored and controlled centrally, automatically restarts in a case where communication problems arise between a parent station and a child station.

DISCLOSURE OF THE INVENTION

Problems To Be Solved By the Invention

However, the prior art is configured so as to restart when communication difficulties arise, and not so that information relating to the state of communication will be reported from the terminal device to the central device. There is a problem that the state of communication cannot be controlled.

With the foregoing problems of the prior art in view, it is an object of the present invention to provide a telemeter system, telemeter system control method, and information recording medium enabling information having an effect on the state of communication between a terminal device and a central device to be readily and accurately reported from the terminal device to the central device.

Means For Solving the Problem

In order to achieve the abovementioned object, the invention according to a first claim is a telemeter system comprising a central device for performing centralized monitoring, and a terminal device connected to the central device via a telecommunication line; the telemeter system being characterized in that the terminal device comprises measuring means for measuring a prescribed item to be measured; and communication means for transmitting, upon receipt of a request signal that has been transmitted from the central device at a prescribed time and that contains identification information indicating a request for measurement result information of the measuring means, the measurement result information to the central device when a communication link with the central device is established or disestablished.

Information having an effect on the state of communication between the terminal device and the central device can be readily and accurately reported from the terminal device to the central device through the abovementioned configuration.

The invention according to a second claim is a telemeter system comprising a central device for performing centralized monitoring; and a terminal device that is provided to a device for opening or closing a door, that is connected to the central device via a telecommunication line, and that reports information regarding operation of the device to the central device; the telemeter system being characterized in that the terminal device comprises measuring means for measuring a prescribed object of measurement; and communication means for transmitting measurement result information obtained from the measuring means to the central device when the door of the device is opened or closed.

The invention according to a third claim is the invention according to the second claim, and is characterized in that the communication means of the terminal device transmits the measurement result information obtained from the measuring means to the central device when the reporting of information regarding the device operation has been properly completed, rather than when the door of the device is opened or closed.

The invention according to a fourth claim is the invention according to the second claim, and is characterized in that the communication means of the terminal device transmits the measurement result information obtained from the measuring means to the central device when a report command button is pressed down, rather than when the door of the device is opened or closed.

The invention according to a fifth claim is the invention according to the second claim, and is characterized in that the communication means of the terminal device transmits the measurement result information obtained from the measuring means to the central device when communication quality of the reporting of the information regarding the device operation is at or below a prescribed level, rather than when the door of the device is opened or closed.

The invention according to a sixth claim is the invention according to the first or second claim, and is characterized in that the central device determines, on the basis of the measurement results obtained from the measuring means, whether or not to report a state of communication to an administrator.

The invention according to a seventh claim is the invention according to the first or second claim, and is characterized in that the communication means transmits the measurement result information via electronic mail.

The invention according to an eighth claim is a telemeter system control method comprising a central device for performing centralized monitoring; and a terminal device connected to the central device via a telecommunication line; the telemeter system control method being characterized in that the terminal device executes a step for measuring prescribed items to be measured, and a step for transmitting, upon receipt of a request signal that has been transmitted from the central device at a prescribed time and that contains identification information indicating a request for measurement result information, the measurement result information to the central device when a communication link with the central device is established or disestablished.

The invention according to a ninth claim is an information recording medium for recording a control program of a telemeter system comprising a central device for performing centralized monitoring, and a terminal device connected to the central device via a telecommunication line; the information recording medium being characterized in that the terminal device measures a prescribed item to be measured, and transmits, upon receipt of a request signal that has been transmitted from the central device at a prescribed time and that contains identification information indicating a request for measurement result information, the measurement result information to the central device when a communication link with the central device is established or disestablished.

BEST MODE FOR CARRYING OUT THE INVENTION

The best mode ("embodiment") for carrying out the present invention will be described below, with reference to the accompanying drawings.

Figure 1:
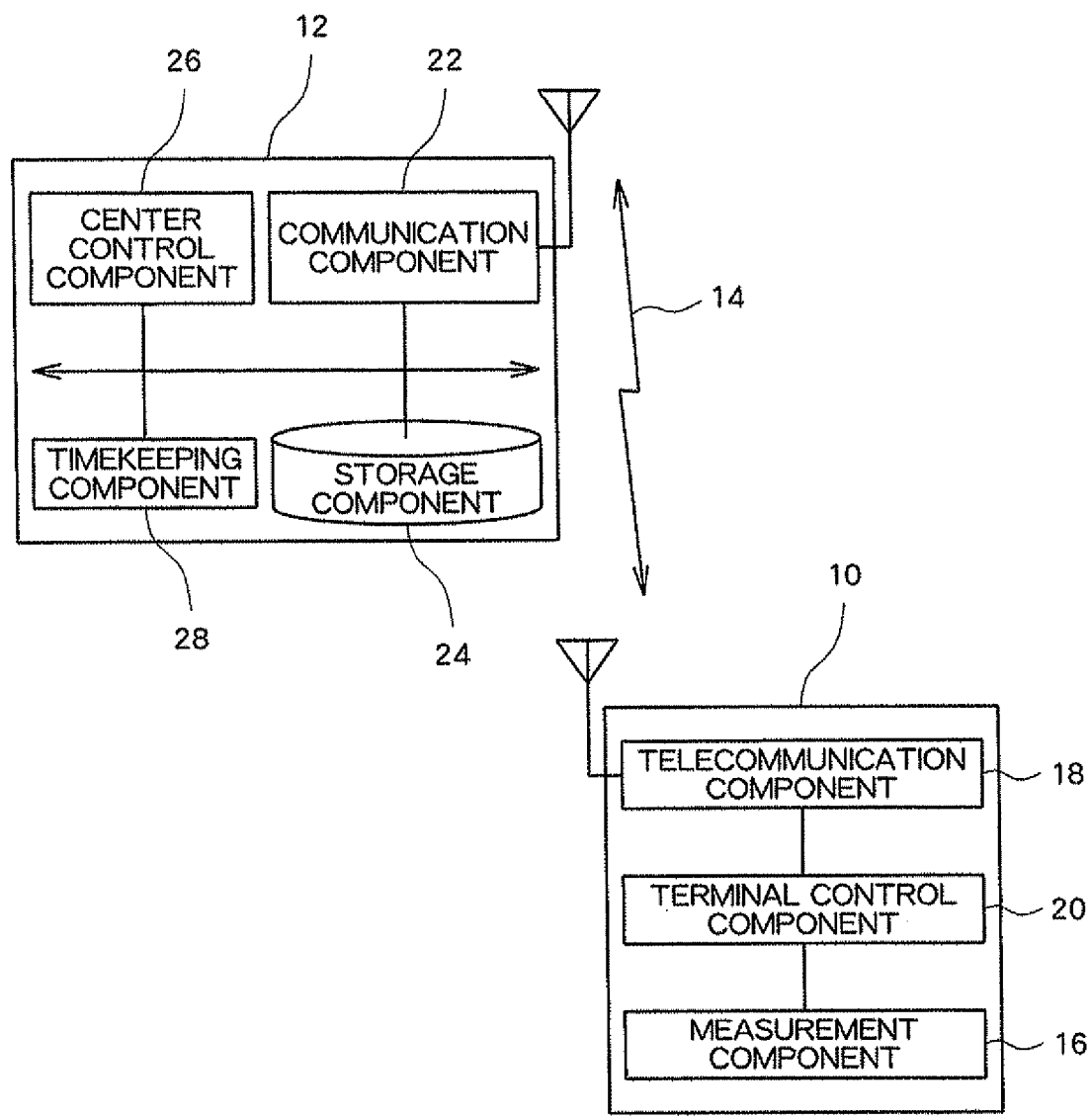
FIG. 1 is a structural diagram of a telemeter system according to an embodiment of the present invention.

FIG. 1 shows a structural diagram of a telemeter system according to an embodiment of the present invention. A terminal device 10 and a central device 12 are connected via a wireless line 14 in FIG. 1. A wired line may be used in place of the wireless line.

The terminal device 10 comprises a measurement component 16, a telecommunication component 18, and a terminal control component 20.

The measurement component 16 executes a process for measuring prescribed items to be measured. The items to be measured include items having an effect on the states of communication made with the central device 12, such as the quality of communication with the central device 12, and the state of operation of the terminal device 10. The communication quality is exemplified by the electric field strength, the incidence of communication failure or disconnection, and whether other communication interference is present. The state of operation of the terminal device 10 is exemplified by the remaining life of the battery for supplying electrical power to the terminal device 10 and the incidence of operational error. In a case where the terminal device 10 is installed in, e.g., an automated vending machine, the measurement component 16 may be configured so as to acquire unit sales made by the automated vending machine and other operation information.

The telecommunication component 18 communicates with the central device 12 using a universally known method, and demonstrates a telecommunication function as a mobile communication terminal.

The terminal control component 20 comprises a CPU (central processing unit) and an operating program associated therewith; and controls the operation of the measurement component 16 and the telecommunication component 18 while exchanging data therewith.

The central device 12 comprises a communication component 22, a storage component 24, a center control component 26, and a timekeeping component 28.

The communication component 22 communicates with the terminal device 10 using a universally known method, and demonstrates a function for receiving desired information. In a case where the terminal device 10 according to the present embodiment is installed, e.g., in an automated vending machine, the information includes sales and other operation information relating to the automated vending machine, measurement result information obtained from the measurement component 16, and other information.

The storage component 24 is composed of, for example, working RAM for the center control component 26, flash memory used as nonvolatile memory, a magnetic recording medium; and stores the address information and telephone number of the terminal device 10, the measurement result information of the measurement component 16 and the operation information taken from the terminal device 10, and other information.

The center control component 26 comprises a CPU (central processing unit) and an operating program associated therewith; and controls the operation of the communication component 22, the storage component 24, and the timekeeping component 28 while exchanging data therewith.

The timekeeping component 28 generates time information used by the center control component 26 using a universally known method.

Figure 2:
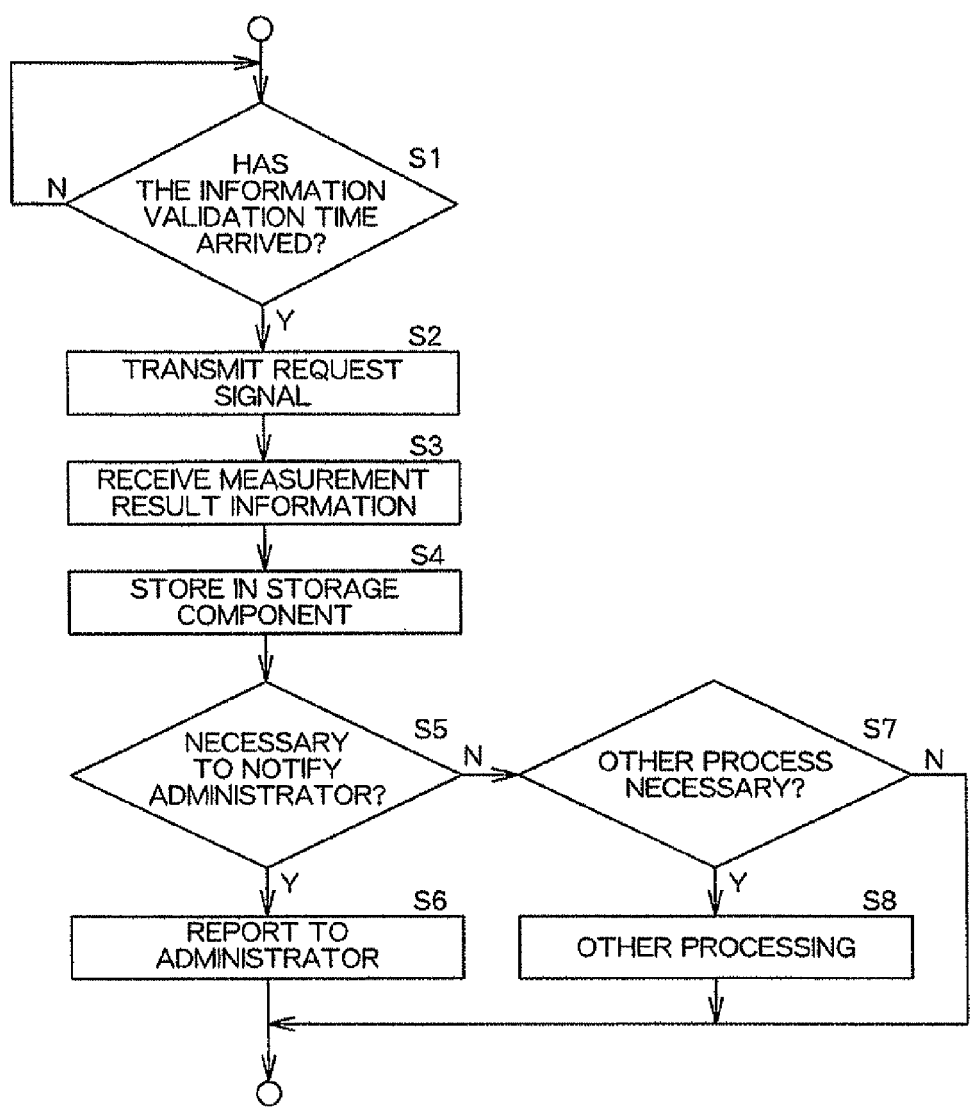
FIG. 2 is a flow chart of an example of the operation of a central device shown in FIG. 1.
Figure 3:
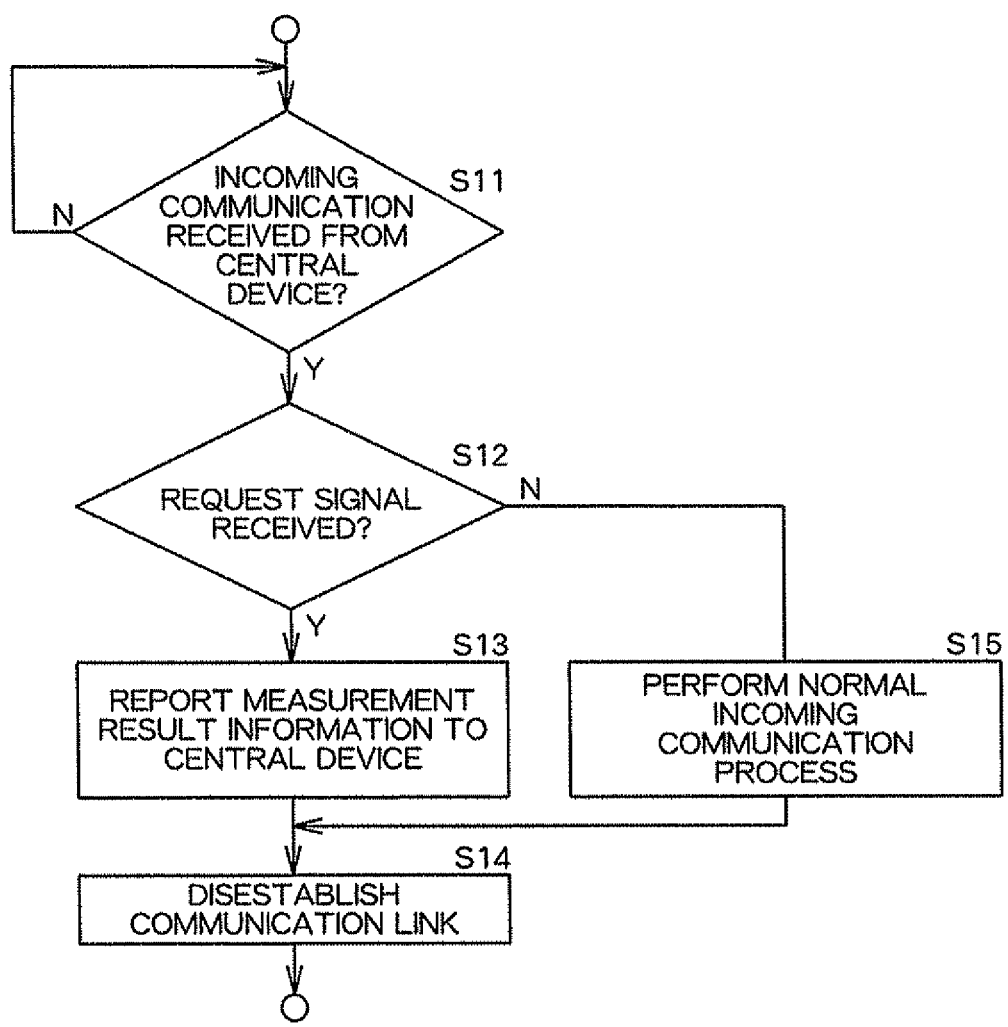
FIG. 3 is a flow chart of an example of the operation of a terminal device shown in FIG. 1.

The flow of an example of the operation of the central device 12 is shown in FIG. 2. The flow of an example of the operation of the terminal device 10 is shown in FIG. 3. FIGS. 2 and 3 show examples of operations that occur when measurement result information is transmitted from the terminal device 10 in response to a request from the central device 12.

In FIG. 2, once a prescribed information validation time has been reached (S1) on the basis of the time information generated by the timekeeping component 28, the center control component 26 obtains a telephone number of the terminal device 10 from the storage component 24, and transmits a request signal (S2) for the purpose of requesting prescribed measurement information measured by the measurement component 16 of the terminal device 10. In a case where the request signal is transmitted via the Internet, the address information of the terminal device 10 is used in place of the telephone number. A signal having identification information (a marker) added thereto is used in the request signal for the purpose of determining that the request signal is different from the regular signals for transmitting and receiving operation information of the apparatus in which the terminal device 10 is installed. For example, UUI (user-to-user information) and the like can be utilized in sending the request signal.

In FIG. 3, when the telecommunication component 18 of the terminal device 10 detects an incoming signal from the central device 12 (S11), the terminal control component 20 analyzes the content of the incoming signal and verifies whether or not the signal is a request signal (S12).

In S12, once the incoming signal has been determined to be a request signal, the terminal control component 20 extracts the measurement result information from the measurement component 16, and transmits the measurement result information to the central device 12 via the telecommunication component 18 (S13). The communication costs associated with transmitting the measurement result information can be reduced by using a short message service; e.g., as provided by NTT DoCoMo, Inc. Once the transmission of the measurement result information is complete, the telecommunication component 18 disestablishes the communication link (S14). The transmitting of the measurement result information can be executed when the communication link has been established or disestablished by the telecommunication component 18. Consequently, more information is able to be sent, because information can be sent even when the communication link is established or disestablished.

In S12, in a case where the incoming signal is determined not to be a request signal, the incoming signal is determined to be a regular signal for requesting operation information, and the prescribed operation information is transmitted to the central device 12 (S15).

Returning to FIG. 2, when the communication component 22 of the central device 12 receives the measurement result information (S3), through the operation of the terminal device 10 shown in the above FIG. 3, the center control component 26 stores the received measurement result information in the storage component 24 (S4).

The center control component 26 then determines the state of communication between the terminal device 10 and the central device 12 on the basis of the information received in regard to the measurement results, and determines whether or not the state of communication needs to be reported to an administrator (S5). This decision is executed on the basis of items having an effect on the state of communication between the terminal device 10 and the central device 12. Specifically, the decision is performed in response to, e.g., whether or not prescribed thresholds have been exceeded in regard to the number of times the electric field strength has decreased, the number of times a communication failure occurs, the number of times the telecommunication link is disconnected, or the number of times a handover process is executed for the purpose of circumventing other telecommunication interference; and in response to the remaining battery life of the terminal device 10, the incidence of operational error, or other factors. The information regarding the items that have an effect on the state of communication is included in the measurement result information.

If it has been determined that the administrator needs to be notified, the center control component 26 reports the state of communication between the terminal device 10 and the central device 12 to the administrator (S6).

If it has been determined in S5 that the administrator does not need to be notified, the center control component 26 determines whether or not any other processes are necessary (S7). Examples of other processes include a successive attempt to obtain the measurement result information by re-transmitting the request signal, and the like.

If it has been determined in S7 that some other processes are necessary, the center control component 26 executes the corresponding processes (S8). If it has been determined that any other processes are not necessary, the operation is completed without the corresponding process being executed.

According to the above description, the process of obtaining the measurement result information is executed through the central device 12. When the report in S6 as described above is made to the administrator by the central device 12, the administrator can ascertain the state of communication between the terminal device 10 and the central device 12, and can determine whether the installation site of the terminal device 10 needs to be changed, can set a time for maintenance, and make other decisions. Consequently, the terminal device 10, which normally functions as an automated terminal, can be suitably controlled.

Using short message service or another form of electronic mail to provide communication between the terminal device 10 and the central device 12 eliminates the need to perform a state transition process such as call answer/go off-hook/dialogue/go on-hook. Consequently, the structure of the terminal device 10 and the central device 12 can be simplified, and the communication time can be reduced.

The program for performing the operation illustrated in FIGS. 2 and 3 may be recorded in and provided by a recording medium that can be read by a computer.

Figure 4:
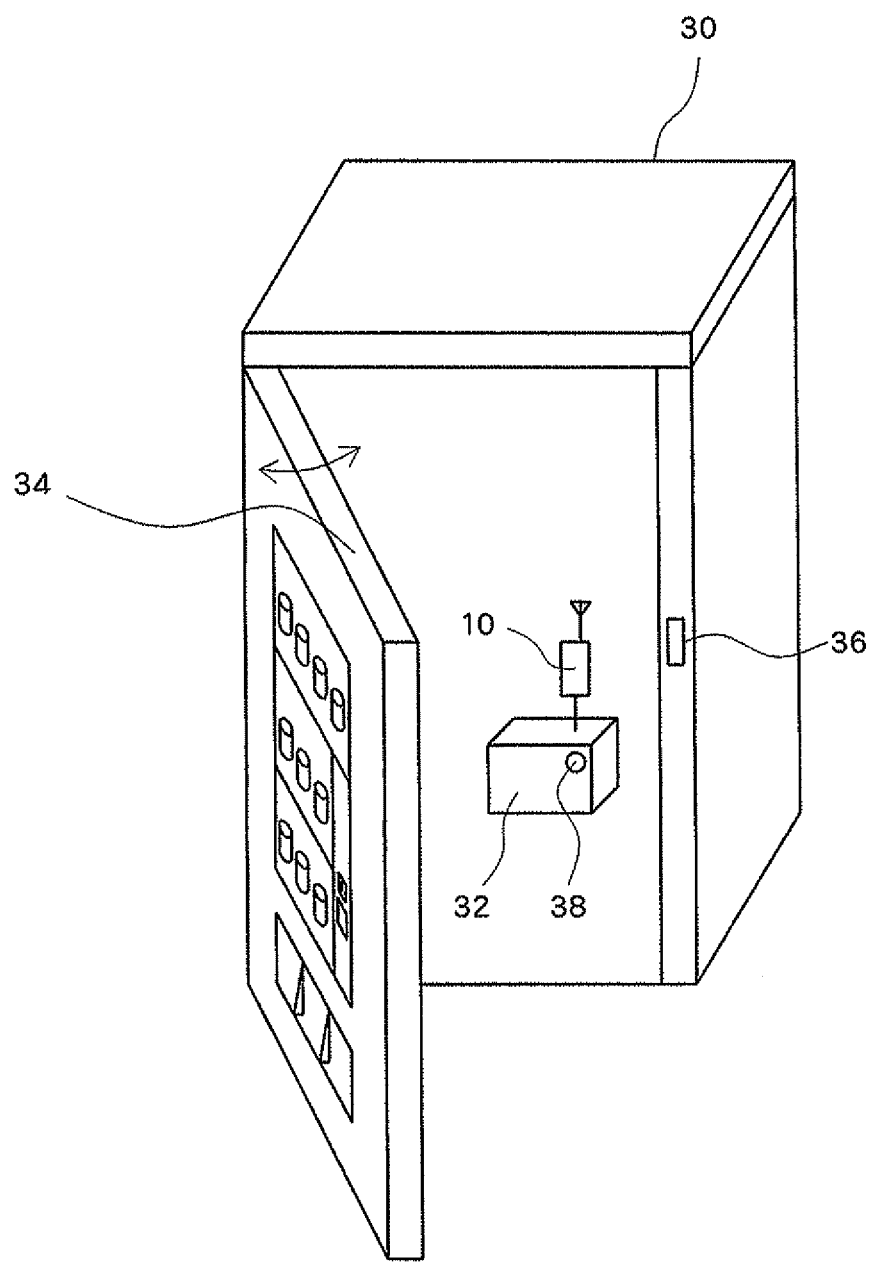
FIG. 4 is a diagram for illustrating a case wherein a telemeter system according to an embodiment of the present invention has been used in an automated vending machine.
Figure 5:
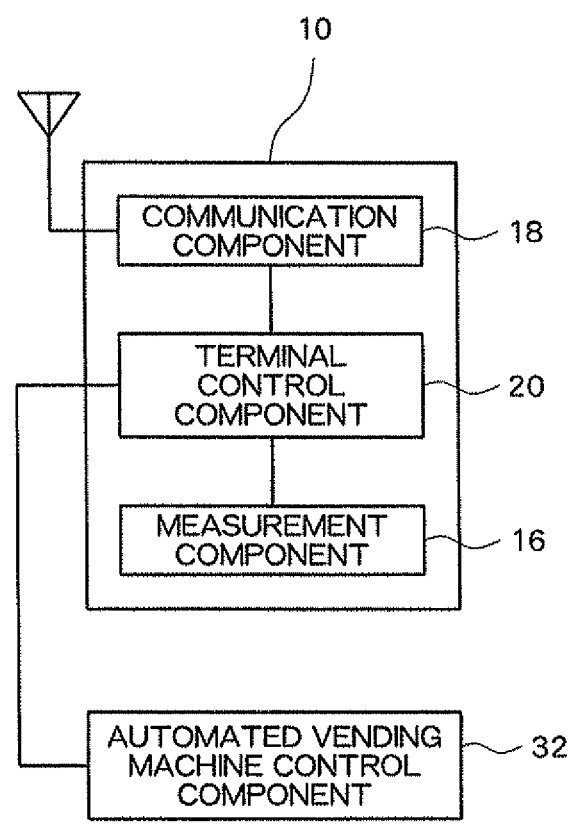
FIG. 5 is a block diagram of a case wherein the telemeter system according to an embodiment of the present invention has been used in an automated vending machine.

FIG. 4 is a diagram illustrating a case wherein a telemeter system according to an embodiment of the present invention has been used in an automated vending machine. FIG. 5 is a block diagram of the application example shown in FIG. 4.

In FIGS. 4 and 5, an automated vending machine control component 32 is provided to an automated vending machine 30 for dispensing soft drinks or the like. The automated vending machine control component 32 periodically transmits sales information and other operation information of the automated vending machine 30 to the central device 12 shown in FIG. 1 via the terminal device 10 according to the present invention.

An opening/closing detector 36 for detecting the opening or closing of a door 34 is further provided to the automated vending machine 30, and the opening or closing of the door 34 is reported to the automated vending machine control component 32.

In the present embodiment, the automated vending machine control component 32 reports to the terminal device 10 that the opening or closing of the door 34 has been detected by the opening/closing detector 36; and at that moment, the telecommunication component 18 transmits the measurement result information obtained by the measurement component 16 to the central device 12. This arrangement obviates the need for the central device 12 to transmit a request signal as illustrated in S2 of FIG. 2, and enables the communication time to be reduced.

The transmitting of the measurement result information may also be executed when an employee on duty presses down a report command button 38 provided to the automated vending machine control component 32, rather than when the door 34 of the automated vending machine 30 is opened or closed. Alternatively, the transmitting of the measurement result information may be executed when the transmitting of the operation information of the automated vending machine 30 has been properly completed, or when the communication quality of the transmission is at or below a prescribed level, rather than when the door 34 of the automated vending machine 30 is opened or closed. The terminal control component 20 of the terminal device 10 determines the timing, as well as the proper completion or communication quality relating to the transmission of the operation information. Such an arrangement enables the communication time to be reduced.

An example of a case wherein a telemeter system according to an embodiment of the present invention has been used in an automated vending machine is illustrated in FIG. 4; however, the present invention is not limited to the above embodiment, and may be used in any device provided that a door has been fitted thereto.

The invention claimed is:

1. A telemeter system comprising:
a central device configured to perform centralized monitoring; and
a terminal device connected to the central device via a telecommunication line,
wherein the terminal device comprises a telecommunication component configured to transmit, upon receipt of a request signal that has been transmitted from the central device, a state of the telecommunication line to the central device, wherein the state of the telecommunication line is a measured indicator of communications quality of the telecommunication line;
wherein the telecommunication component transmits operation information of a vending machine; and
wherein, in response to communications quality of the transmitting of the operation information of the vending machine being lower than a predetermined level, the telecommunication component transmits the measured indicator.

2. The telemeter system according to claim 1,
wherein, after the transmitting of the operation information of the vending machine is successfully completed, the telecommunication component transmits the measured indicator.

3. A telemeter system comprising:
a central device configured to perform centralized monitoring; and
a terminal device connected to the central device via a telecommunication line,
wherein the terminal device comprises a telecommunication component configured to transmit, upon receipt of a request signal that has been transmitted from the central device, measurement result information regarding a prescribed item indicating communications quality of the telecommunication line to the central device just before a communication link with the central device is disestablished;
wherein the telecommunication component transmits operation information of a vending machine; and
wherein, in response to communications quality of the transmitting of the operation information of the vending machine being lower than a predetermined level, the telecommunication component transmits the measurement result information.

4. A telemeter system comprising:
a central device configured to perform centralized monitoring; and
a terminal device connected to the central device via a telecommunication line,
wherein the terminal device comprises a telecommunication component configured to transmit, upon receipt of a request signal that has been transmitted from the central device, measurement result information regarding a prescribed item indicating communications quality of the telecommunication line to the central device via electronic mail;
wherein the telecommunication component transmits operation information of a vending machine; and
wherein, in response to communications quality of the transmitting of the operation information of the vending machine being lower than a predetermined level, the telecommunication component transmits the measurement result information.

5. A vending machine connected to a central device performing centralized monitoring via a telecommunication line comprising:
a telecommunication component configured to transmit, upon receipt of a request signal that has been transmitted from the central device, a state of the telecommunication line to the central device, wherein the state of the telecommunication line is a measured indicator of communications quality of the telecommunication line;
wherein the telecommunication component transmits operation information of a vending machine; and
wherein, in response to communications quality of the transmitting of the operation information of the vending machine being lower than a predetermined level, the telecommunication component transmits the measured indicator.

6. A vending machine connected to a central device performing centralized monitoring via a telecommunication line comprising:
a telecommunication component configured to transmit, upon receipt of a request signal that has been transmitted from the central device, measurement result information regarding a prescribed item indicating communications quality of the telecommunication line to the central device just before a communication link with the central device is disestablished;
wherein the telecommunication component transmits operation information of a vending machine; and
wherein, in response to communications quality of the transmitting of the operation information of the vending machine being lower than a predetermined level, the telecommunication component transmits the measurement result information.

7. A vending machine connected to a central device performing centralized monitoring via a telecommunication line comprising:
a telecommunication component configured to transmit, upon receipt of a request signal that has been transmitted from the central device, measurement result information regarding a prescribed item indicating communications quality of the telecommunication line to the central device via electronic mail;
wherein the telecommunication component transmits operation information of a vending machine; and
wherein, in response to communications quality of the transmitting of the operation information of the vending machine being lower than a predetermined level, the telecommunication component transmits the measurement result information.

8. A method for a terminal device connected to a central device configured to perform centralized monitoring via a telecommunication line, the method comprising:
transmitting, upon receipt of a request signal that has been transmitted from the central device, a state of the telecommunication line to the central device, wherein the state of the telecommunication line is a measured indicator of communications quality of the telecommunication line;
wherein the telecommunication component transmits operation information of a vending machine; and
wherein, in response to communications quality of the transmitting of the operation information of the vending machine being lower than a predetermined level, the telecommunication component transmits the measured indicator.

9. A method for a terminal device connected to a central device configured to perform centralized monitoring via a telecommunication line, the method comprising:
transmitting, upon receipt of a request signal that has been transmitted from the central device, measurement result information regarding a prescribed item indicating communications quality of the telecommunication line to the central device just before a communication link with the central device is disestablished;

wherein the telecommunication component transmits operation information of a vending machine; and wherein, in response to communications quality of the transmitting of the operation information of the vending machine being lower than a predetermined level, the telecommunication component transmits the measurement result information.

10. A method for a terminal device connected to a central device configured to perform centralized monitoring via a telecommunication line, the method comprising:

transmitting, upon receipt of a request signal that has been transmitted from the central device, measurement result information regarding a prescribed item indicating communications quality of the telecommunication line to the central device via electronic mail;

wherein the telecommunication component transmits operation information of a vending machine; and wherein, in response to communications quality of the transmitting of the operation information of the vending machine being lower than a predetermined level, the telecommunication component transmits the measurement result information.

* * * * *